UNITED STATES PATENT OFFICE.

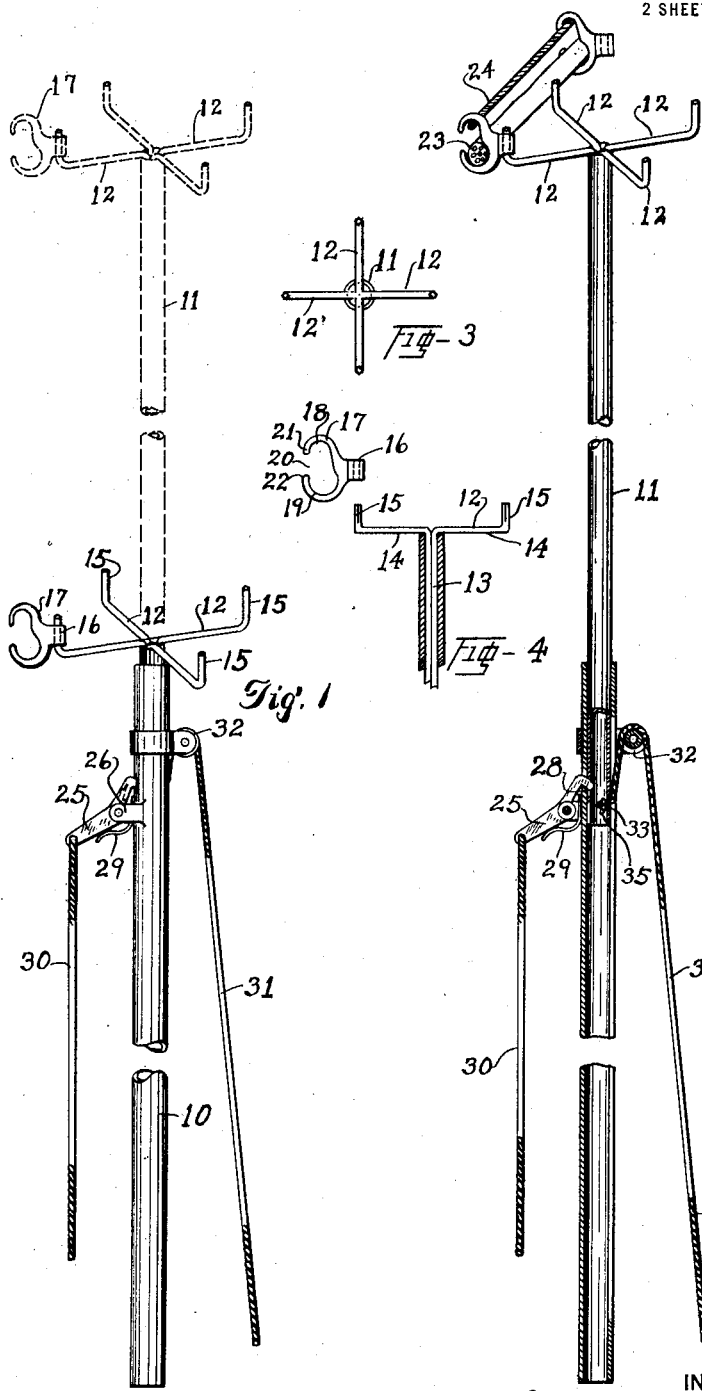

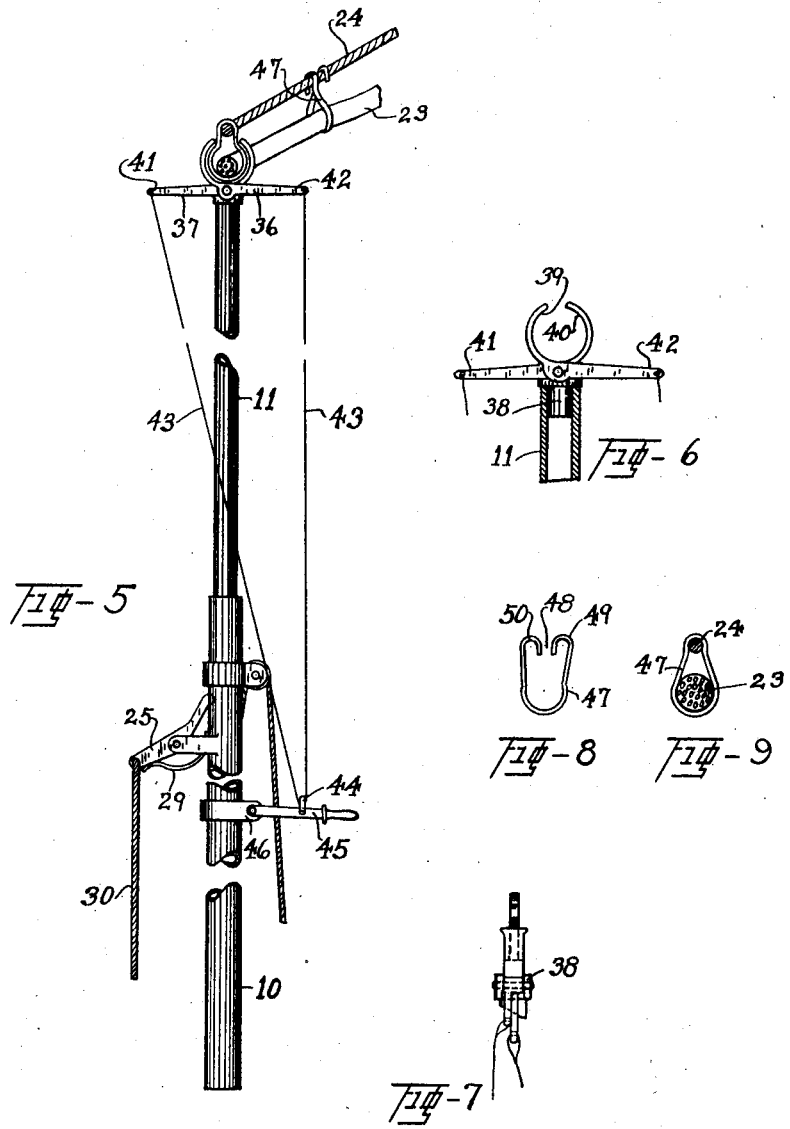

JAMES H. JESSUP, OF SALEM, OHIO.

CABLE-TIE HANGER.

1,384,761.   Specification of Letters Patent.   Patented July 19, 1921.

Application filed April 14, 1920. Serial No. 373,837.

*To all whom it may concern:*

Be it known that I, JAMES H. JESSUP, a citizen of the United States, residing at Salem, in the county of Columbiana and State of Ohio, have invented a certain new and useful Improvement in Cable-Tie Hangers, of which the following is a full, clear, and exact description, reference being had to the accompanying drawings.

The general purpose of this invention is to provide a convenient, easily operable, means for positioning cable ties or hooks, to secure a current carrying cable to the usual wire rope or supporting cable by the use of an extensible pole, whereby the operator may remain on the ground and position or remove the cable supports.

The methods heretofore used for tying the current carrying cable to the supporting cable involved the practice of swinging a seat on the supporting cable. This seat carries a wheel or wheels which were adapted to fit over the supporting cable and to travel along it. The operator using this seat would travel from one cable supporting pole to another and space the connecting ties at definite intervals along the line. Frequently these connecting ties and supporting cables became weakened by corrosion of the metal after long exposure. Under such conditions it would be unsafe for a man to be supported by and move along the wire rope cable to repair the broken connecting ties.

An object of this invention is to provide a connecting tie which is adapted to embrace the cables or be removed therefrom and to provide means for positioning this tie in place while the operator remains on the ground. Another object is to provide means which is adapted to clamp connecting ties of a certain existing type into position without compelling an operator to travel over the supporting cable.

I accomplish the above objects by providing a connecting tie which, with the aid of a telescopic tube, can be positioned over the cables, and which will remain in position without the necessity of clamping any portion thereof. Further, I provide a modified form having a clamping mechanism adapted to be supported by my telescopic tube, whereby existing connecting ties of a certain type may be clamped over the supporting cable, while the operator remains on the ground.

The above and other objects will become more apparent in the following description which relates to the drawings. The essential characteristics are summarized in the claims.

In the drawings Figure 1 is an elevation of the telescopic tube in closed position; Fig. 2 is a sectional view in the nature of a perspective embodying the features of my invention, showing the telescopic tube in extended position; Figs. 3 and 4 are details of the connecting tie and its holder; Fig. 5 is an elevation in the nature of a perspective showing the clamping device; Figs. 6 and 7 are details of the clamping device; Figs. 8 and 9 represent the connecting tie, in open or closed position, with which my clamping device is adapted to be used.

Designating the parts by the use of reference characters in Fig. 1, 10 represents the outer tube which may be substantially a metallic tube open at one or both ends and which should be constructed of material of sufficient strength to withstand a bending moment caused by supporting the inner tube from its upper end. Slidably mounted within the outer member 10, and closely embraced thereby, is the inner section 11, which may or may not be a hollow tube, but which is substantially of the same length as the outer tube, or if desired it may project beyond both ends of the outer tube, when the unit is in a closed position. The inner tube is adapted to be manually raised or moved longitudinally with relation to the outer tube, to enable an operator standing on the ground to position the top of the inner tube at the approximate height of the supporting cable, to which the current carrying cable is to be secured.

The top of the inner section 11 is adapted to carry one or more fingers 12, which may comprise heavy wire bent to the desired form or a casting possessing the required form and strength. As shown in Figs. 3 and 4, the fingers 12 comprise strips of wire, each having a portion 13 inserted in the end of the tube 11, while the portions 14 are bent outwardly over the top thereof, and then upwardly as at 15 to form a hook substantially as shown. The projections 15 of the fingers are adapted to fit into openings 16 of the connecting tie 17. A number of these connecting ties may then be inserted on the fingers. The connecting ties have a rounded upper portion 18, the inner periphery of which is substantially complementary to the outer periphery of a supporting cable, while the lower inner portion 19 is substantially complementary to the outer periphery of the current carrying cable. The connecting tie is so formed that a space 20 between the end of the tie 21 and the end 22 is substantially somewhat larger than the diameter of the current carrying cable to permit the current carrying cable 23 to be slipped into the connecting tie, and then to permit the tie to be positioned over the supporting cable 24.

Positioned near the upper portion of the outer member 10 is a clamping lever 25 supported in bearings in the lug 26. The clamping lever may have a projection 28 at its upper end, which is adapted to pass through an opening in the member 10, and then into an opening in the inner tube 11 whenever the inner tube is moved so as to bring the openings in registration with that in the outer tube. A spring 29 constantly urges the point 28 inwardly, while the cable 30 may be secured to one end thereof to cause disengagement of the lever from the registered openings. By spacing the openings in the inner tube at various points it is possible to clamp the unit in any desired position.

To cause movement of the inner member with relation to the outer member, I provide a cable 31 which passes over a pulley wheel 32 rigidly secured near the top of the tube 10 and then through a slot, which extends longitudinally of the tube 10, and through an opening 33 in the tube 11. The cable may then be fastened to the tube 11 in such manner for example, as by tying a knot in the end thereof. It will be seen that a downward pull on the lower portion 34 of the cable will cause an upward motion of the end 35 and a similar motion in the tube 11.

As shown in Fig. 5, I provide a modified form of my invention to adapt it to be used with existing ties of a certain type. This modification comprises a clamping device having a pair of jaws 36 and 37 which may be rotatably mounted in a bifurcated collar 38 at the top of the tube 11. The jaws are preferably constructed so that the gripping faces 39—40 closely resemble the contour of the connecting tie which it is adapted to embrace. The outer ends 41—42 of the jaws are adapted to receive a cord 43 which passes from the arm 36 downwardly through an eye 44 in a lever 45 then upwardly to the arm 37. The lever 45 is rotatably secured to a collar 46. The collar 46 is positioned near the lower portion of the tube 10 so that the operator can hold the unit in one hand and move the lever 45 with the other hand. It will be seen that a downward motion of the lever 45 causes a clamping action to be effected by the jaws 36—37.

This type of clamping device is well adapted to be used with a connecting tie 47 as shown in Fig. 8. The current carrying cable 23 and the supporting cable 24 are slipped through the space 48 in the connecting tie. Then pressure is exerted on the jaws. This forces the top portions 49—50 together whereupon a downward movement on the extension unit causes the supporting cable to be securely lodged in position. The connecting tie after being shifted into position is shown in Fig. 9.

To insert the connecting tie into position with the type of mechanism shown in Fig. 1, it is only necessary for the operator to place the connecting tie on the supporting fingers, while the extension unit is in the closed position. A downward movement of the cable 30 will release the clamping lever to permit the inner tube to be extended. The operator can then hold the cable 30 with the same hand that holds the tube 10 while the other hand is used to cause a downward motion on the cable 31. This causes the inner tube 11 to be extended beyond the end of the outer tube, and when the top of the inner tube reaches a point, which is approximately the height of the supporting cable above the ground, then the cable 30 can be slackened, whereupon the clamping lever 25 will be urged inwardly. When any desired opening in the inner tube registers with the opening in the outer tube, through which this clamping lever passes, then the lever, if released, will enter that opening and cause the telescopic members to be clamped. The operator may then use both hands to direct the placing of the connecting tie and after the tie has been placed in position, the extension unit may be lowered, thus disengaging the finger from the connecting tie. A quarter of a revolution of the extension unit will then bring another connecting tie into position for repeating the operation.

To use the clamping device as shown in Fig. 5, the operator must insert the connecting tie within the clamping jaws at the top of the inner member before the unit is extended. After the unit has been extended as heretofore explained, then an upward motion of the unit will cause the connecting tie to slip over the supporting cable and current carrying cable whereupon a downward motion of the lever 45 will effect a clamping motion on the jaw members thus causing the top portions of the connecting tie to be brought past each other. A downward motion of the unit will then cause the supporting cable to enter the loops in the connecting tie. The jaws may then be released and the mechanism lowered to repeat the operation.

It will be seen that I have constructed a device that is light in weight, durable, and capable of being cheaply manufactured. Further, I have provided a device which enables an operator to repair the connecting ties which are in use at the present time without risking his life on weak supporting cables; further, that I have devised a connecting tie which is simple and readily adapted to be used with my extension unit, so that an operator may insert the tie in position while standing on the ground.

The preferred form of my invention possesses the advantage of raising several connecting ties at once, and of enabling the operator to place these ties in position during one period of extension of the pole. It is possible to so arrange the fingers which hold the ties, that a large number of ties may be positioned while the pole is extended.

The form of device shown in Figs. 5 to 9, inclusive, is not claimed specifically in this case as it is shown, described and claimed in my copending divisional application No. 426,953, filed November 29, 1920.

Having thus described my invention, I claim:

1. In a cable tie hanger, an extensible member comprising telescopic tubes, one of said tubes carrying work holding means, means for moving said work carrying tube from one end of the other tube, and means operable from said end for holding said work carrying tube in position.

2. In a cable tie hanger, the combination with one member longitudinally movable with relation to another member, means for holding cable ties in the movable member, a series of notches in one of the members and a pawl carried by the other member and adapted to engage one of the notches, whereby the members may be adjusted to various positions with relation to each other.

3. In a cable tie hanger, telescopic members, comprising an outer member and an inner work carrying member, means operable from one end of said outer member for adjusting the inner member, a ratchet in one of the said members and a pawl in the other member adapted to coöperate with said ratchet, means for normally holding said pawl in engagement with said ratchet, and means operable from the said end of the outer member to release said pawl.

4. In a cable tie hanger, the combination of one member longitudinally movable with relation to another member, a series of notches on one of said members and a pawl on the other member for holding the members in adjusting relation to each other, one of the said members having means for holding a connecting tie, means operable from the end of one member for moving the other member, and means operable from said end for releasing said pawl.

5. In a cable tie hanger, telescopic members comprising an outer member and an inner work carrying member, and a pulley wheel attached adjacent one of said outer members, a cable passing over said wheel and having one end thereof passing through a slot therein and secured to the other telescopic member, means for retaining said members in adjusted position and means operable from one end of said outer member for releasing said retaining means.

6. In a cable tie hanger, the combination with a plurality of telescopic tubes, of fingers rigidly secured to one of said tubes, said fingers being adapted to hold connecting ties, means for moving one tube with relation to the other, and means for adjusting the tubes relative to each other and for holding them in various positions of adjustment.

7. In a cable tie hanger, the combination with a plurality of telescopic tubes, of fingers adapted to carry connecting ties, means for elevating one tube within another, a spring pressed clamping lever pivoted in a lug on one of said tubes and adapted to removably engage another tube through an opening in said first mentioned tube, and means for manually operating said clamping lever.

8. In a cable tie hanger, the combination with an extensible supporting means, of spaced fingers secured to one of said telescopic members, said fingers being adapted to support cable ties whereby the same may be positioned and a supporting means removed therefrom.

9. In a telescopic cable tie hanger, the combination with an extensible supporting means, of a plurality of spaced fingers rigidly secured to the upper end thereof, the ends of said fingers being bent and each adapted to remove a connecting tie whereby upon manipulation of the supporting means the connecting ties may be positioned.

10. In a cable tie hanger, the combination with an extensible support comprising telescopic members, a plurality of spaced fingers rigidly secured to the upper end of the inner tube, said fingers each comprising a portion extending away from said member and an upstanding portion substantially parallel therewith and adapted to pass into openings in a tie, and means for extending said support.

11. In a cable tie hanger, the combination with an extensible support comprising telescopic tubes, a plurality of spaced fingers rigidly secured to the upper end of the inner tube, said fingers each comprising a portion extending into said tube, a horizontally extending portion adjacent thereto and an upstanding portion adapted to pass into openings in a tie, and means for extending said support.

12. In a device of the class described, the combination with an extensible support comprising telescopic members, a plurality of spaced fingers rigidly secured to the upper end of the inner member, each of said fingers comprising an upstanding portion and a portion extending at an angle thereto to form a stop therefor, and a cable tie resting on said stop and having an opening therein through which said upstanding portion of said fingers extends.

13. In a device of the class described, the combination with an extensible support comprising telescopic members, a plurality of spaced fingers rigidly secured to the upper end of the inner member, each of said fingers comprising an upstanding portion and a portion extending at an angle thereto to form a stop therefor, and a cable tie resting on said stop and having an opening therein through which said upstanding portion of said fingers extends, said tie having spaced stationary jaws for receiving a cable.

JAMES H. JESSUP.